US012512072B2

(12) United States Patent
Sun et al.

(10) Patent No.: US 12,512,072 B2
(45) Date of Patent: Dec. 30, 2025

(54) COMPUTER FOR ADJUSTING SCENE BRIGHTNESS, METHOD FOR ADJUSTING SCENE BRIGHTNESS AND PROCESSING METHOD FOR ESTABLISHING SCENE BRIGHTNESS

(71) Applicant: GIGA-BYTE TECHNOLOGY CO., LTD., New Taipei (TW)

(72) Inventors: Pei-Hua Sun, New Taipei (TW); Ting-Hui Lee, New Taipei (TW)

(73) Assignee: GIGA-BYTE TECHNOLOGY CO., LTD., New Taipei (TW)

( * ) Notice: Subject to any disclaimer, the term of this patent is extended or adjusted under 35 U.S.C. 154(b) by 0 days.

(21) Appl. No.: 18/766,711

(22) Filed: Jul. 9, 2024

(65) Prior Publication Data

US 2025/0201202 A1 Jun. 19, 2025

(30) Foreign Application Priority Data

Dec. 14, 2023 (TW) ................................ 112148880

(51) Int. Cl.
*G09G 3/34* (2006.01)
*G09G 3/36* (2006.01)

(52) U.S. Cl.
CPC ............. *G09G 3/3406* (2013.01); *G09G 3/36* (2013.01); *G09G 2320/062* (2013.01); *G09G 2320/0626* (2013.01); *G09G 2320/08* (2013.01)

(58) Field of Classification Search
CPC ... G09G 2320/0626; G09G 2320/0633; G09G 2320/064; G09G 2320/0646;
(Continued)

(56) References Cited

U.S. PATENT DOCUMENTS

2022/0022307 A1 1/2022 Wang et al.

FOREIGN PATENT DOCUMENTS

CN 111210777 A 5/2020
CN 115578990 A 1/2023
(Continued)

OTHER PUBLICATIONS

Office Action of the corresponding Taiwan patent application No. 112148880 mailed on Sep. 23, 2024.
(Continued)

*Primary Examiner* — Koosha Sharifi-Tafreshi
(74) *Attorney, Agent, or Firm* — Birch, Stewart, Kolasch & Birch, LLP

(57) ABSTRACT

A computer and a method for adjusting scene brightness and a processing method for establishing scene brightness are provided. The computer includes a display device, a power unit, a storage unit, a processing unit, and a detection unit. The display device includes a logic unit, and a backlight unit. The detection unit fetches a logic current value of the logic unit. The power unit is connected to the logic unit and the backlight unit. The storage unit stores a lookup table recording default scene current values and target brightness currents matching application scenes of the application program. The processing unit is connected to the display device, the power unit, the storage unit, and the detection unit to execute the application program, fetch a current scene and the logic current value, select a target brightness current, and drive the power unit to provide the target brightness current for the backlight unit.

12 Claims, 6 Drawing Sheets

(58) Field of Classification Search
CPC ......... G09G 2320/0653; G09G 3/3406; G09G 3/3413; G09G 3/342; G09G 3/3426; G09G 3/36; G09G 2320/0233; G09G 2320/062
See application file for complete search history.

(56) References Cited

FOREIGN PATENT DOCUMENTS

| | | | | | |
|---|---|---|---|---|---|
| CN | 116312416 | A | | 6/2023 | |
| CN | 116825049 | A | * | 9/2023 | ............... G09G 5/10 |
| CN | 118506743 | A | * | 8/2024 | ........... G09G 3/3426 |
| JP | 2009003318 | A | | 1/2009 | |
| KR | 20060078505 | A | | 7/2006 | |
| KR | 20170120128 | A | | 10/2017 | |
| TW | 201405523 | A | | 2/2014 | |

OTHER PUBLICATIONS

Office Action of the corresponding Korean patent application No. 10-2024-0027270 mailed on Sep. 30, 2024.

* cited by examiner

133

| | Default scene current value 164 | Target brightness current 165 |
|---|---|---|
| Application scene_1 | Current value A | Current value A1 |
| Application scene_2 | Current value B | Current value B1 |
| Application scene_3 | Current value C | Current value C1 |

FIG. 2

COMPUTER FOR ADJUSTING SCENE BRIGHTNESS, METHOD FOR ADJUSTING SCENE BRIGHTNESS AND PROCESSING METHOD FOR ESTABLISHING SCENE BRIGHTNESS

CROSS-REFERENCE TO RELATED APPLICATION

This non-provisional application claims priority under 35 U.S.C. § 119(a) to Patent Application No. 112148880 in Taiwan, R.O.C. on Dec. 14, 2023, the entire contents of which are hereby incorporated by reference.

BACKGROUND

Technical Field

The instant disclosure relates to an electronic device and method for adjusting and establishing brightness, in particular, to a computer for adjusting scene brightness, a method for adjusting scene brightness, and a processing method for establishing scene brightness.

Related Art

Along with the rapid developments of liquid crystal display (LCD), the types of the LCDs become diversified. For eSports players, in addition to the response speed, the display device also has requirements for display brightness and display contrast.

SUMMARY

Especially, for dark scenes of games, the performance of different LCDs in the dark place will be different. High-end display devices may have features such as high contrast ratio or high dynamic range (HDR). Therefore, when the high-end display devices are displaying dark scenes, the devices can still provide the viewer (such as the player) with certain amounts of visible details. However, for mid-range and low-end display devices, the viewer may not be able to see game-related characters or objects in dark scenes.

The viewer may increase the overall brightness by adjusting the brightness or contrast of the display device, so that the viewer can see objects in dark scenes. However, when the player leaves the dark scenes or exits the game, the display device is still in a high brightness or high contrast environment. As a result, the overall brightness of the display device is too high. Thus, not only the viewer may feel glare upon viewing the display device, but also the viewer needs to adjust the brightness setting back to default setting manually.

In view of this, in one embodiment, a computer for adjusting scene brightness is provided. The computer for adjusting scene brightness is configured to adjust display brightness of various scenes of an application program and comprises a display device, a power unit, a storage unit, a processing unit, and a detection unit. The display device has a logic unit and a backlight unit. The detection unit is configured to fetch a logic current value of the logic unit. The power unit is connected to the logic unit and the backlight unit. The storage unit stores a lookup table, and the lookup table records default scene current values and target brightness currents matching a plurality of application scenes of the application program. The processing unit is connected to the display device, the power unit, the storage unit, and the detection unit. The processing unit is configured to execute the application program to fetch a current scene and the logic current value, the processing unit is configured to select a target brightness current as a selected target brightness current according to the current scene or the logic current value, and the processing unit drives the power unit to provide the selected target brightness current for the backlight unit. The computer can adjust the display brightness according to the current scene, and the user does not need to adjust the brightness of the display device manually. Moreover, when the application scene is changed, the user does not need to adjust the brightness of the display device again.

In one embodiment, a method for adjusting scene brightness is provided. The method comprises executing an application program by using a computer to fetch a current scene; fetching a logic current value of a logic unit of a display device by using the computer; looking up a lookup table according to the current scene or the logic current value by using the computer to select a target brightness current among target brightness current, wherein the lookup table records a plurality of scene information of the application program, and each of the scene information matches a corresponding one of default scene current values and a corresponding one of the target brightness currents; and providing the target brightness current for a backlight unit of the display device by using the computer.

In one embodiment, a processing method for establishing scene brightness is provided. The processing method comprises fetching a panel attribute of a display device by using a computer; fetching a logic current value of the display device for an application scene operated in an application program by using the computer; adjusting a brightness of the display device to a target brightness by using the computer to fetch a target brightness current of the target brightness; and recording the logic current value and the target brightness current to a lookup table according to the application scene by using the computer.

According to one or some embodiments, the computer and method for adjusting scene brightness provides the computer with automatic brightness adjustment function in different application scenes. Therefore, the user does not need to set the brightness or contrast for the display or the driver manually. Moreover, after the scene of the application program is changed, the computer can adjust the brightness according to the current application scene. Hence, the adjustment costs (such as the adjustment time or the setting values) for settings of the display device by the user can be reduced.

BRIEF DESCRIPTION OF THE DRAWINGS

The disclosure will become more fully understood from the detailed description given herein below for illustration only, and thus not limitative of the disclosure, wherein:

FIG. 2 illustrates a schematic diagram of a lookup table according to an exemplary embodiment of the instant disclosure;

DETAILED DESCRIPTION

Figure 1:
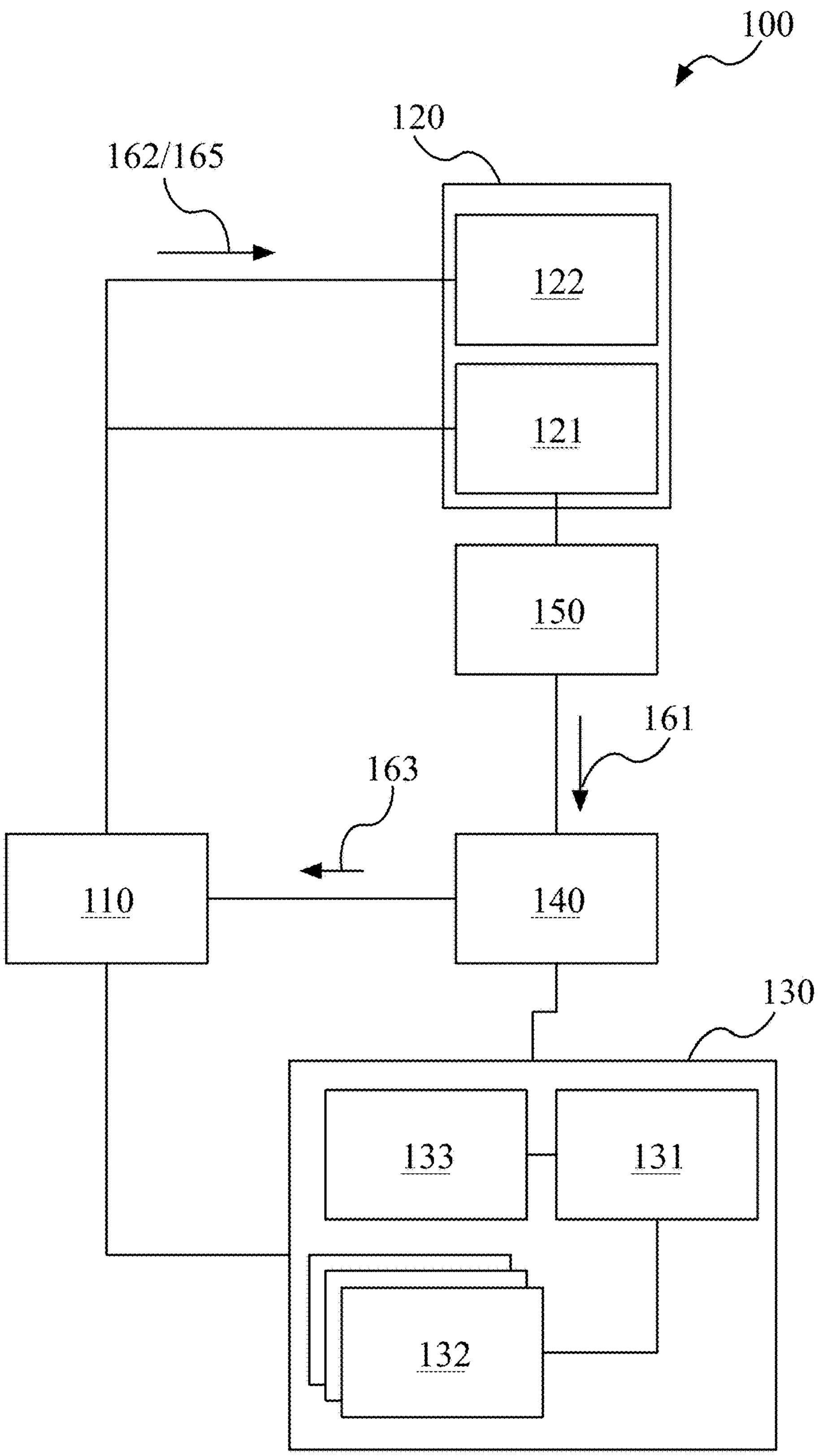
FIG. 1 illustrates a schematic diagram of a computer for adjusting scene brightness according to an embodiment of the instant disclosure.

Please refer to FIG. 1. FIG. 1 illustrates a schematic diagram of a computer for adjusting scene brightness according to an embodiment of the instant disclosure. the computer for adjusting scene brightness (hereinafter, simply referred to as computer 100) comprises a power unit 110, a display device 120, a storage unit 130, a processing unit 140, and a detection unit 150. The computer 100 may be a personal computer, a notebook computer, a telecommunication device, a tablet computer, or the like. The processing unit 140 is connected to the power unit 110, the display device 120, and the storage unit 130. The power unit 110 provides the processing unit 140, the display device 120, and the storage unit 130 with electricity for operation. The processing unit 140 may send control command 163 to the power unit 110 to adjust the operation current 162 of the backlight unit 122.

The type of the display device 120 may be, but not limited to, an IPS (In-Plane Switching) panel, a PLS (Plane-to-Line) panel, a VA (Vertical Alignment) panel, or a TN (Twisted Nematic) panel. The display device 120 further comprises a logic unit 121 and a backlight unit 122. The detection unit 150 is connected to the processing unit 140, the logic unit 121, and the backlight unit 122. The logic unit 121 controls the extent of the rotation of the liquid crystal molecules to adjust colors or brightness (transmissivity) of different regions of the display device 120. The backlight unit 122 is configured to provide the overall brightness of the display device 120. The power unit 110 is connected to the logic unit 121 and the backlight unit 122 respectively to provide the logic unit 121 and the backlight unit 122 with electricity for operation. The detection unit 150 is connected between the power unit 110 and the logic unit 121, the detection unit 150 is configured to fetch a logic current value 161 of the logic unit 121 upon the logic unit 121 is operating. The detection unit 150 transmits the logic current value 161 to the processing unit 140. The power unit 110 provides the operation current 162 for the backlight unit 122.

The storage unit 130 stores a monitoring program 131, a plurality of application programs 132, and a lookup table 133. The lookup table 133 records a plurality of application scenes of each of the application programs 132, and each of the application scenes matches a corresponding one of default scene current values 164 and a corresponding one of target brightness currents 165, as shown in FIG. 2. For the application programs 132 of games, the game may provide a variety of different application scenes, and each of the application scenes has a corresponding display brightness.

The display device 120 outputs different scene brightness for different application scenes. Therefore, the logic unit 121 has to control the rotation of liquid crystal molecules. Accordingly, different scene brightness match different operation currents 162, and the operation currents 162 are referred to as default scene current values 164. Moreover, it is understood that the brightness difference between a first scene and a second scene may be different from the brightness difference between the first scene and a third scene, the difference of the adjusted brightness is referred to as target brightness, and correspondingly the adjusted brightness is referred to as target brightness current 165, as shown in FIG. 2. In other words, in some embodiments, each of the application scenes matches a corresponding target brightness current 165.

Figure 3:
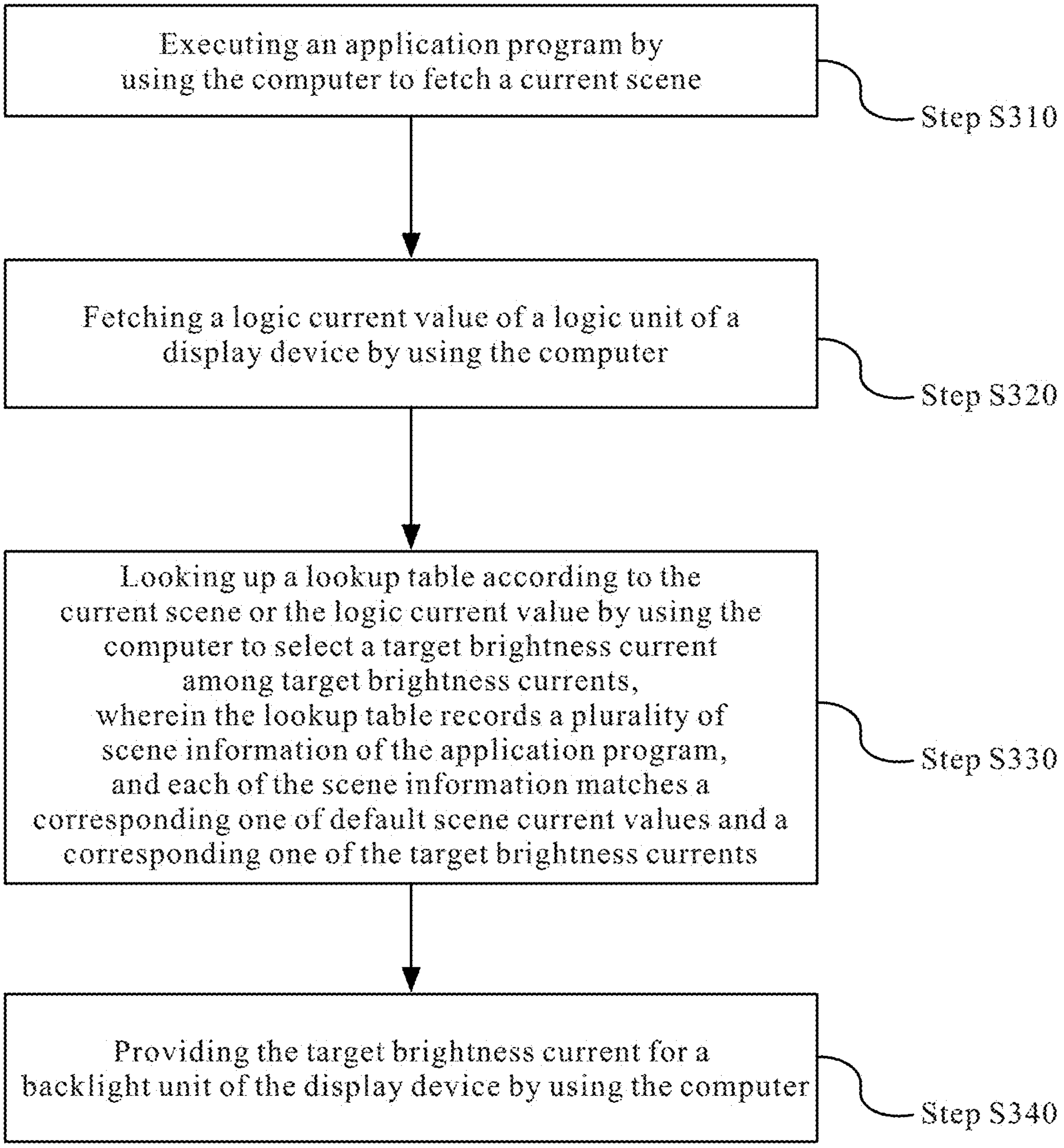
FIG. 3 illustrates a flowchart of a method for adjusting brightness of a display device according to an embodiment of the instant disclosure.

When the processing unit 140 executes the application program 132, the processing unit 140 may fetch the logic current value 161 from the detection unit 150 periodically. The processing unit 140 determines whether the brightness of the display device 120 is to be adjusted or not according to the logic current value 161. The process for determining and adjusting the brightness of the display device 120 by using the processing unit 140 can be referred to FIG. 3, which include following steps:

Step S310: executing an application program by using the computer to fetch a current scene;

Step S320: fetching a logic current value of a logic unit of a display device by using the computer;

Step S330: looking up a lookup table according to the current scene or the logic current value by using the computer to select a target brightness current among target brightness currents, wherein the lookup table records a plurality of scene information of the application program, and each of the scene information matches a corresponding one of default scene current values and a corresponding one of the target brightness currents; and Step S340: providing the target brightness current for a backlight unit of the display device by using the computer.

Firstly, the processing unit 140 executes the monitoring program 131. The monitoring program 131 may be an individual application program 132 or a system program built in the operation system. After the application program 132 is executed, the monitoring program 131 may fetch the application program 132 through the operation system. The monitoring program 131 compares the fetched application program 132 with the lookup table 133. In response to that the lookup table 133 does not have the fetched application program 132, the monitoring program 131 does not perform operations regarding looking up and selecting target brightness current 165. In response to that the lookup table 133 has the fetched application program 132, the monitoring program 131 can fetch the application scene and the logic current value 161 from the detection unit 150 periodically.

The monitoring program 131 may take the color change of the application program 132 as a basis for identification of the current application scene. In general, when the game program displays a darker scene, the overall changes of pixels of the display device 120 are consistent and the color values of the pixels of the display device 120 are values within darker regions. Taking the display device 120 adopting RGB system as an example, the pixels in darker scenes may be distributed between RGB(0,0,0) and RGB(20,20,20). Moreover, the monitoring program 131 may fetch the execution status of the application program 132 through the operation system so as to determine the contents of the application scene. Alternatively, in some embodiments, the monitoring program 131 may determine the application scene through the hardware information, the driver, or the register of the display card.

When the processing unit 140 executes the application program 132, the monitoring program 131 fetches the logic current value 161 of the logic unit 121 during the execution of the application program 132. In response to that the colors of the pixels in the application scene meet the distribution mentioned above, the monitoring program 131 determines that the application scene is a current scene. The monitoring program 131 then fetches the logic current value 161 of the current scene. The monitoring program 131 looks up the lookup table 133 according to the current scene or the logic current value 161 to select the target brightness current 165 corresponding to the current scene or the logic current value 161, as shown in FIG. 2. The processing unit 140 sends a new control command 163 to the power unit 110, so that the power unit 110 changes the operation current 162 as the selected target brightness current 165 and provides the selected target brightness current 165 for the backlight unit 122, thereby allowing the backlight unit 122 to increase the brightness.

In some embodiments, the monitoring program 131 looks up the lookup table 133 according to the current scene, and the monitoring program 131 fetches an application scene and a default scene current value 164 corresponding to the current scene. Next, the monitoring program 131 determines whether the logic current value 161 matches the default scene current value 164 or not. In response to that the logic current value 161 does not match the default scene current value 164, the processing unit 140 selects the target brightness current 165 and drives the power unit 110 to provide the selected target brightness current 165 for the backlight unit 122. The processing unit 140 provides different matching criteria for the logic current value 161 and the default scene current value 164 according to the types of the display device 120.

In the case that the display device 120 is an IPS panel, a PLS panel, or a VA panel, in response to that the logic current value 161 is less than the default scene current value 164, the condition is defined as not matched. By applying a voltage to the IPS panel, the PLS panel, or the VA panel, the amount of the transmitted light of the backlight unit 122 to the LCD can be increased, thereby increasing the brightness of the screen of the display device 120.

Therefore, upon the voltage is not applied to the IPS panel, the PLS panel, or the VA panel, the screen of the display device 120 is completely black. On the other hand, when the screen of the display device 120 is completely white, the logic current value 161 of the logic unit 121 is a maximum value. The monitoring program 131 can determine whether the screen of the display device 120 is dark or bright according to the logic current value 151 of the logic unit 121. In response to that the logic current value 161 does not match the default scene current value 164, the target brightness current 165 is greater than the logic current value 161. The monitoring program 131 selects the target brightness current 165, and the power unit 110 provides the target brightness current 165 for the backlight unit 122, thereby increasing the amount of the light emission of the backlight unit 122. Hence, because the brightness of light emission of the backlight unit 122 is increased, the overall brightness of the display device 120 is also increased.

Figure 4:
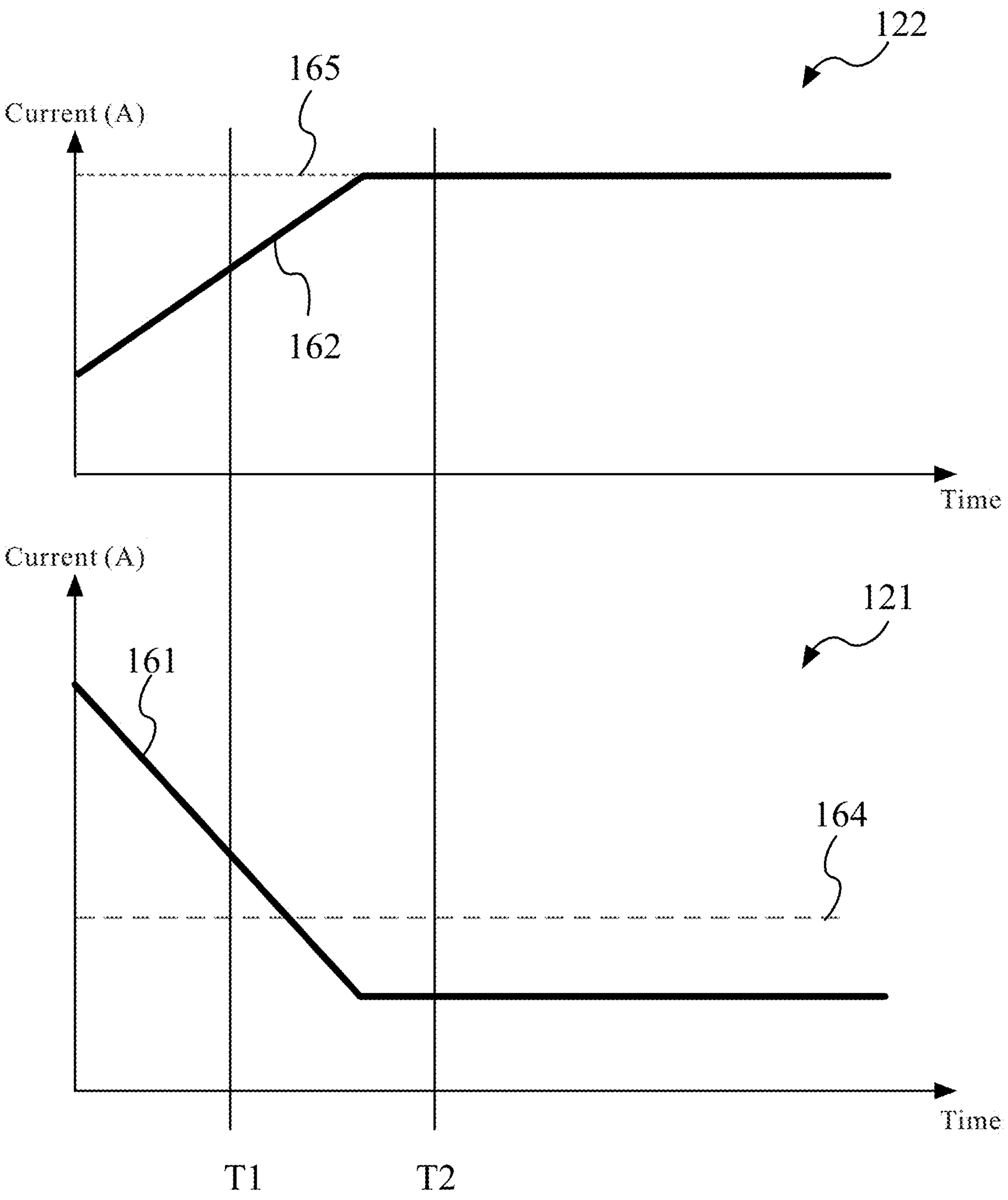
FIG. 4 illustrates a graph of the logic current value according to an embodiment of the instant disclosure, where the application scene is changed.

Taking the embodiment shown in FIG. 4 as an example, the upper part of FIG. 4 illustrates a curve of the operation current 162 of the backlight unit 122 over time, and the lower part of FIG. 4 illustrates a curve of the logic current value 161 of the logic unit 121 over time. Supposed that the processing unit 140 fetches the current scene at time T1, the processing unit 140 looks up the lookup table 133 according to the current scene, and at time T2, the processing unit 140 fetches the default scene current value 164 and the target brightness current 165 corresponding to the current scene. At time T1 shown in FIG. 4, the processing unit 140 determines that the logic current value 161 is less than the scene current value 164. As mentioned, regarding the IPS panel, the PLS panel, or the VA panel, in response to that the logic current value 161 is less than the default scene current value 164, the condition is not matched. Therefore, the processing unit 140 determines that the application scene of the display device 120 is a "dark scene". After the processing unit 140 fetches the target brightness current, the processing unit 140 allows the power unit 110 to provide the target brightness current 165 instead for the backlight unit 122.

In the case that the display device 120 is a TN panel, in response to that the logic current value 161 is greater than the default scene current value 164, the condition is defined as not matched. By applying a voltage to the TN panel, the logic unit 121 blocks the light from the backlight unit 122, thereby reducing the overall brightness of the display device 120. In response to that the logic current value 161 does not match the default scene current value 164, the monitoring program 131 fetches a target brightness current 165 according to the current scene. In other words, in some embodiments, in response to that the logic current value 161 does not match the default scene current value 164, the target brightness current 165 is less than the logic current value 161. The power unit 110 provides the selected target brightness current 165 for the backlight unit 122, thereby increasing the amount of the light emission of the backlight unit 122. Hence, even though the logic unit 121 of the display device 120 is not adjusted, the overall brightness of the display device 120 can still be increased.

In some embodiments, the monitoring program 131 may fetch the logic current value 161 periodically. Therefore, the monitoring program 131 can temporarily store the fetched logic current value 161 in the storage unit 130. Upon the monitoring program 131 is fetching a current logic current value 161, the monitoring program 131 may loads the previously fetched logic current value 161 and conduct a calculation for the difference between the previously fetched logic current value 161 and the current logic current value 161 to fetch a current change amount. The monitoring program 131 determines whether the current change amount is greater than a threshold value. In response to that the current change amount is greater than the threshold value, the monitoring program 141 determines that the brightness of the current scene is changed to be a "dark scene". Therefore, the monitoring program 131 looks up a default scene current value 164 and a target brightness current 165 corresponding to the default scene current value 164 in the lookup table 133 according to the current logic current value 161.

The monitoring program 131 drives the power unit 110 according to the target brightness current 165 to allow the power unit 110 to provide the target brightness current 165 instead for the backlight unit 122 of the display device 120. Because the new target brightness current 165 is greater than the original current value, the brightness of light emission of the backlight unit 122 is increased, thereby increasing the brightness of the screen of the display device 120.

When the application scene is changed again, the monitoring program 131 also executes the step S320 to fetch the logic current value 161. The monitoring program 131 determines whether the new application scene is brighter, darker, or unchanged, compared with the previous application scene. In the case that the new application scene is brighter, the monitoring program 131 can change the target brightness current 165 back to the operation current 162. The monitoring program 131 lowers the brightness of the backlight unit 122 to decrease the brightness of the screen of the display device 120 to meet the new application scene.

Therefore, the user does not need to adjust the brightness of the display device 120 manually.

Figure 5:
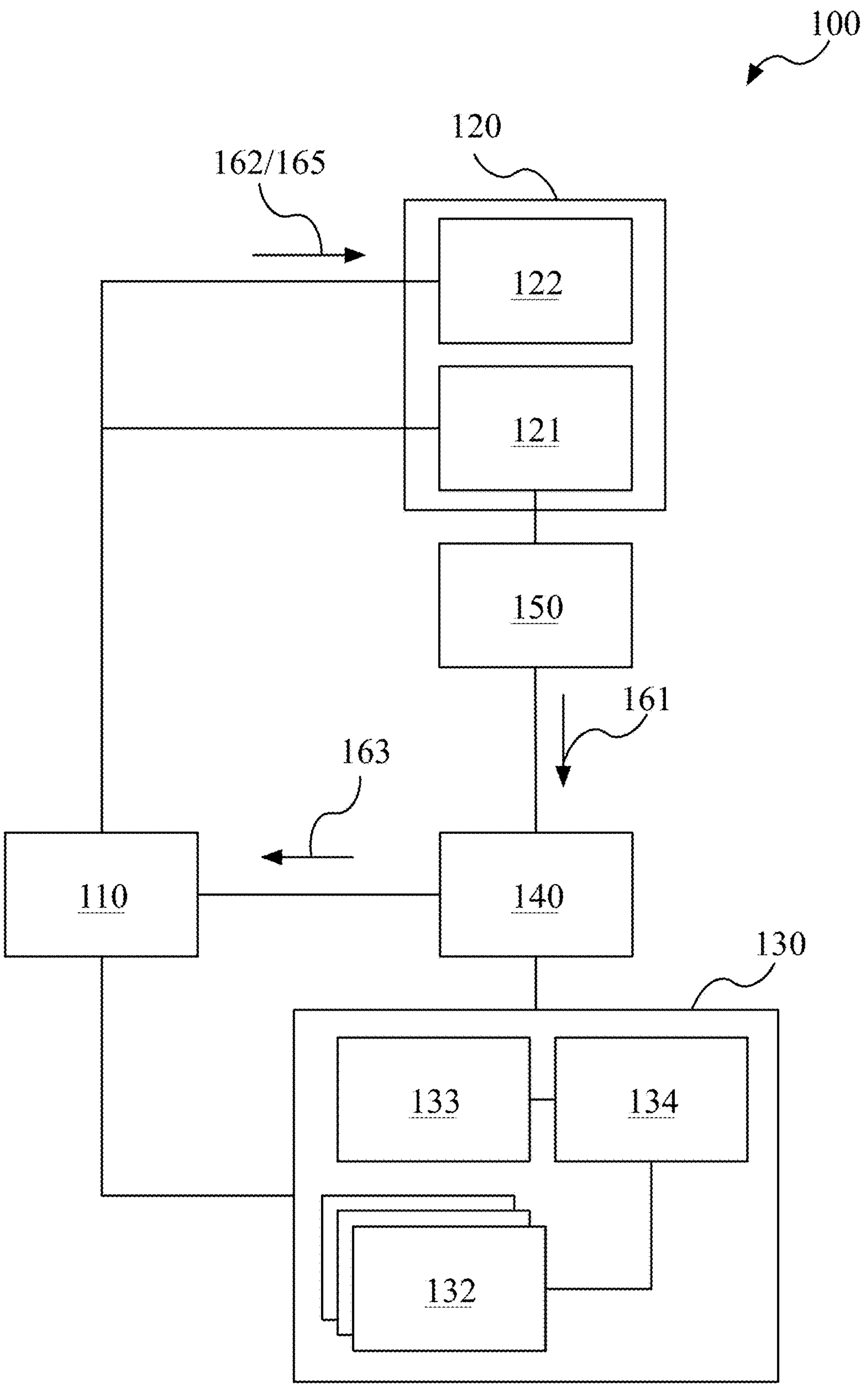
FIG. 5 illustrates a schematic diagram of a computer for adjusting scene brightness according to another embodiment of the instant disclosure.

In some embodiments, the computer 100 is further configured to perform a processing method for establishing related information of a lookup table 133. The computer 100 comprises a power unit 110, a display device 120, a storage unit 130, and a processing unit 122 can be referred to FIG. 5. The storage unit 130 further stores the lookup table 133, an application program 132, and a table-establishing program 134.

In some embodiments, the lookup table 133 further records the panel attribute. The panel attribute may be at least one selected from the group consisting of panel type, a panel size, a panel resolution, a refresh rate, a response time, a color gamut range, and a connection interface. The panel type may be IPS panel, PLS panel, VA panel, or TN panel. The connection interface may be but not limited to a High Definition Multimedia Interface (HDMI), a DisplayPort interface, or an Embedded DisplayPort (eDP) interface.

Figure 6:
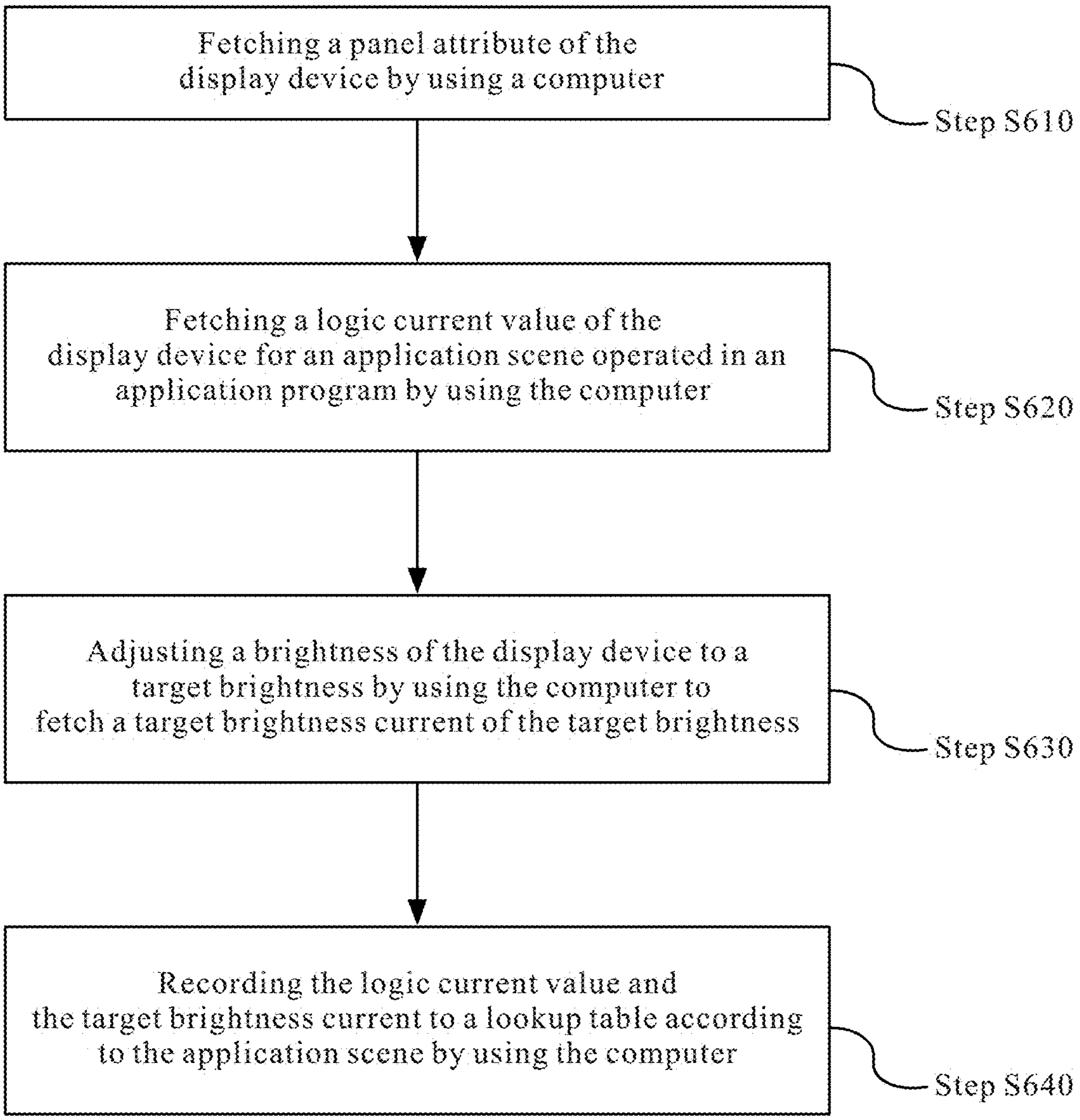
FIG. 6 illustrates a flowchart of a method for adjusting brightness of a display device according to another embodiment of the instant disclosure.

The processing unit 140 executes the table-establishing program 134 to establish current values corresponding to different scene brightness in the lookup table 133. The processing method for establishing and adjusting scene brightness can be referred to FIG. 6, which include following steps:

Step S610: fetching a panel attribute of the display device by using a computer;

Step S620: fetching a logic current value of the display device for an application scene operated in an application program by using the computer;

Step S630: adjusting a brightness of the display device to a target brightness by using the computer to fetch a target brightness current of the target brightness; and Step S340: providing the target brightness current for the display unit of the display device by using the computer; and Step S640: recording the logic current value and the target brightness current to a lookup table according to the application scene by using the computer.

Firstly, the processing unit 140 executes the table-establishing program 134. The table-establishing program 134 may fetch the panel attribute of the display device 120 through the operation system or the Basic Input/Output System (BIOS). The table-establishing program 134 records the panel attribute in the lookup table 133. After the processing unit 140 executes the application program 132, the table-establishing program 134 fetches the logic current value 161 of the display device 120 upon the application program 132 is executing. At the same time, the table-establishing program 134 can record logic current values 161 corresponding to various application scenes, and the recorded logic current values 161 are the default scene current values 164. In other words, in some embodiments, each of the application scenes records a corresponding one of the default scene current values 164.

Next, the table-establishing program 134 increases the brightness of the backlight unit 122 until the brightness of the display device 120 reaches a target brightness. The target brightness may be determined by a testing personnel or a color correction device. The table-establishing program 134 fetches the driving current value for driving the backlight unit 122 according to the target brightness, and the table-establishing program 134 records the fetched current value in the column of the target brightness current 153 of the lookup table 133. The table-establishing program 134 records default brightness current values (identical to the default scene current values 164) and the target brightness current 165 for different application scenes.

Taking that the computer 100 is a notebook computer for example, where the notebook computer has an eDP interface, a 15-inch IPS panel, a resolution of 1920*1080, a refresh rate of 240 Hz. In the eDP interface, the $36^{th}$ to $39^{th}$ pins (BL_PWR) are configured to control the brightness of the backlight unit 122, while the $18^{th}$ to $21^{st}$ pins (LCD_VCC) are configured to control the logic unit 121 to rotate the liquid crystal molecules. As mentioned, for the IPS panel, in the case that the screen of the display device 120 is completely black, the liquid crystal molecules are not needed to be rotated, and thus the logic current value 161 for operating the display device 120 is a minimum value. On the other hand, in the case that the screen of the display device is completely white, the logic current value 161 for operating the display device 120 is a maximized value. The table-establishing program 134 may provide different display screen (identical to application scenes) (for example, a black and white Mosaic pattern screen or an RGB Mosaic pattern screen) as the reference for arranging the logic current values 161.

Upon the notebook computer executes different application programs 132 (for example, Diablo 4, The Witcher 3, or other games), the table-establishing program 134 fetches the logic current values 161 according to the daytime scenes and nighttime scenes of the game, and the table-establishing program 134 lists the logic current values 161 of different application scenes as below, for example.

TABLE 1 the correspondence table between the application scenes of the application program and the logic current values

| Application program | Application scene | Logic current value (mA) |
|---|---|---|
| Table-establishing program | Completely white screen | 1547 |
| | Completely dark screen | 536 |
| | Black and white Mosaic pattern screen | 872 |
| | RGB Mosaic pattern screen | 1254 |
| Diablo 4 | Daytime scenes | 1192 |
| | Nighttime scenes | 658 |
| The Witcher 3 | Daytime scenes | 1176 |
| | Nighttime scenes | 645 |

The table-establishing program 134 can record the current value corresponding to the scene in the lookup table 133. Moreover, the table-establishing program 134 can fetch the difference between the current value corresponding to the daytime scenes of the application program 132 and the current value corresponding to the nighttime scenes of the application program 132, and the table-establishing program 134 can records the difference as the current change amount in the lookup table 133.

According to one or some embodiments, the computer 100 and method for adjusting scene brightness provides the computer 100 with automatic brightness adjustment function in different application scenes. Therefore, the user does not need to set the brightness or contrast for the display device 120 or the driver manually. Moreover, after the scene of the application program 132 is changed, the computer 100 can adjust the brightness according to the current application scene. Hence, the adjustment costs (such as the adjustment time or the setting values) for settings of the display device 120 by the user can be reduced.

What is claimed is:

1. A computer for adjusting scene brightness configured to adjust display brightness of various scenes of an application program, wherein the computer for adjusting scene brightness comprises:

a display device having a logic unit and a backlight unit;

a power unit connected to the logic unit and the backlight unit;

a storage unit storing a lookup table, wherein the lookup table records default scene current values and target brightness currents respectively matching a plurality of application scenes of the application program;

and a processing unit connected to the display device, the power unit, and the storage unit, wherein the computer is configured to fetch a logic current value of the logic unit, the processing unit is configured to execute the application program to fetch a current scene and the logic current value, the processing unit is configured to, according to the current scene or the logic current value, select a target brightness current among the target brightness currents as a selected target brightness current, and the processing unit is configured to drive the power unit to provide the selected target brightness current for the backlight unit.

2. The computer for adjusting scene brightness according to claim 1, wherein the processing unit is configured to look up the lookup table according to the current scene to fetch an application scene among the application scenes and a default scene current value among the default scene current values which correspond to the current scene; and wherein in response to that the processing unit determines that the logic current value does not match the default scene current value, the processing unit selects a target brightness current among the target brightness current corresponding to the current scene as a selected target brightness current, and the power unit provides the selected target brightness current for the backlight unit.

3. The computer for adjusting scene brightness according to claim 2, wherein in response to that the logic current value is less than the default scene current value, the logic current value does not match the default scene current value, and the target brightness current is greater than the logic current value.

4. The computer for adjusting scene brightness according to claim 2, wherein in response to that the logic current value is greater than the default scene current value, the logic current value does not match the default scene current value, and the target brightness current is less than the logic current value.

5. The computer for adjusting scene brightness according to claim 1, wherein in response to that the processing unit determines that a current change amount of the logic current value is greater than a threshold value, the processing unit looks up a default scene current value among the default scene current values according to the logic current value and selects a target brightness current corresponding to the logic current value as a selected target brightness current, and the power unit provides the selected target brightness current for the backlight unit.

6. A method for adjusting scene brightness, comprising:

executing an application program by using a computer to fetch a current scene;

fetching a logic current value of a logic unit of a display device by using the computer;

looking up a lookup table according to the current scene or the logic current value by using the computer to select a target brightness current among target brightness currents, wherein the lookup table records a plurality of scene information of the application program, and each of the scene information matches a corresponding one of default scene current values and a corresponding one of the target brightness currents; and providing the target brightness current for a backlight unit of the display device by using the computer.

7. The method for adjusting scene brightness according to claim 6, wherein the step of "looking up a lookup table according to the current scene or the logic current value by using the computer to select a target brightness current among target brightness currents" comprises:

determining whether the logic current value matches the default scene current value by using the computer; and in response to that the logic current value does not match the default scene current value, providing the target brightness current for the backlight unit by using the computer.

8. The method for adjusting scene brightness according to claim 7, wherein the step of "in response to that the logic current value does not match the default scene current value, providing the target brightness current for the backlight unit by using the computer" comprises:

in response to that the logic current value is less than the default scene current value, the logic current value does not match the default scene current value, and the target brightness current is greater than the logic current value.

9. The method for adjusting scene brightness according to claim 7, wherein the step of "in response to that the logic current value does not match the default scene current value, providing the target brightness current for the backlight unit by using the computer" comprises:

in response to that the logic current value is greater than the default scene current value, the logic current value does not match the default scene current value, and the target brightness current is less than the logic current value.

10. The method for adjusting scene brightness according to claim 6, wherein the step of "looking up a lookup table according to the current scene or the logic current value by using the computer to select a target brightness current among target brightness currents" comprises:

determining whether a current change amount of the logic current value is greater than a threshold value by using the computer;

in response to that the current change amount is greater than the threshold value, looking up the lookup table according to the logic current value by using the computer to fetch the default scene current value and the target brightness current corresponding to the target brightness current for the backlight unit by using the computer.

11. A processing method for establishing scene brightness, comprising:

fetching a panel attribute of a display device by using a computer;

fetching a logic current value of the display device for an application scene operated in an application program by using the computer;

adjusting a brightness of the display device to a target brightness by using the computer to fetch a target brightness current of the target brightness; and recording the logic current value and the target brightness current to a lookup table according to the application scene by using the computer.

12. The processing method for establishing scene brightness according to claim 11, wherein the lookup table further records the panel attribute of the display device, and wherein the panel attribute is at least one selected from the group consisting of panel type, a panel size, a panel resolution, a refresh rate, a response time, a color gamut range, and a connection interface.

* * * * *